(12) United States Patent
Nobuta et al.

(10) Patent No.: US 10,766,178 B2
(45) Date of Patent: Sep. 8, 2020

(54) SCREW FOR INJECTION MOLDING MACHINE, INJECTION MOLDING MACHINE, AND INJECTION MOLDING METHOD

(71) Applicants: U-MHI PLATECH CO., LTD., Nagoya-shi, Aichi (JP); MITSUBISHI HEAVY INDUSTRIES, LTD., Tokyo (JP)

(72) Inventors: Munehiro Nobuta, Nagoya (JP); Naoki Toda, Nagoya (JP); Toshihiko Kariya, Nagoya (JP); Takeshi Yamaguchi, Nagoya (JP); Kiyoshi Kinoshita, Nagoya (JP)

(73) Assignees: U-MHI PLATECH CO., LTD., Nagoya-Shi, Aichi (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 455 days.

(21) Appl. No.: 15/541,281

(22) PCT Filed: Jan. 15, 2015

(86) PCT No.: PCT/JP2015/000156
§ 371 (c)(1),
(2) Date: Jun. 30, 2017

(87) PCT Pub. No.: WO2016/113776
PCT Pub. Date: Jul. 21, 2016

(65) Prior Publication Data
US 2017/0355119 A1    Dec. 14, 2017

(51) Int. Cl.
*B29C 45/50*    (2006.01)
*B29C 45/60*    (2006.01)
(Continued)

(52) U.S. Cl.
CPC ............... *B29C 45/50* (2013.01); *B29B 7/14* (2013.01); *B29B 7/24* (2013.01); *B29B 7/421* (2013.01);
(Continued)

(58) Field of Classification Search
CPC ....... B29C 45/50; B29C 45/005; B29C 45/03; B29C 45/60
(Continued)

(56) References Cited

U.S. PATENT DOCUMENTS 8,900,506 B2    12/2014    Kariya et al.
2004/0257904 A1    12/2004    Zhang et al.
(Continued)

FOREIGN PATENT DOCUMENTS

CN    101554771 A    10/2009
CN    102958666 A    3/2013
(Continued)

OTHER PUBLICATIONS

PCT, "International Preliminary Report on Patentability for International Application No. PCT/JP2015/000156," dated Jul. 27, 2017.
(Continued)

*Primary Examiner* — Jeffrey M Wollschlager
*Assistant Examiner* — Xue H Liu
(74) *Attorney, Agent, or Firm* — Manabu Kanesaka; Benjamin Hauptman; Kenneth Berner (57) ABSTRACT

Provided is a screw that is for use in an injection molding machine and that makes it possible to benefit from the kneading effect of a multi-start screw while minimizing the received friction resistance. The screw for an injection molding machine is provided with a first stage 20 on the upstream side and a second stage 30 on the downstream side. The screw for an injection molding machine is characterized in that: the first stage 20 is provided with a compression
(Continued)

section 22 comprising a main scraper 25 and an auxiliary scraper 26 having a smaller outer diameter than the main scraper 25; and the second stage 30 is provided with a multi-start screw section 31, said multi-start screw section being provided on the upstream side and comprising a plurality of scrapers, and a fin kneading section 32 provided downstream from the multi-start screw section.

7 Claims, 3 Drawing Sheets

(51) Int. Cl.

| | | |
|---|---|---|
| *B29B 7/42* | (2006.01) | |
| *B29B 7/60* | (2006.01) | |
| *B29B 7/14* | (2006.01) | |
| *B29B 7/24* | (2006.01) | |
| *B29B 7/90* | (2006.01) | |
| *B29C 45/00* | (2006.01) | |
| *B29C 45/03* | (2006.01) | |
| *B29K 105/12* | (2006.01) | |
| *B29K 101/12* | (2006.01) | |
| *B29K 105/06* | (2006.01) | |

(52) U.S. Cl.
CPC ............... *B29B 7/60* (2013.01); *B29B 7/90* (2013.01); *B29C 45/0005* (2013.01); *B29C 45/03* (2013.01); *B29C 45/60* (2013.01); *B29K 2101/12* (2013.01); *B29K 2105/06* (2013.01); *B29K 2105/12* (2013.01)

(58) Field of Classification Search
USPC .................................................... 264/328.17
See application file for complete search history.

(56) References Cited

U.S. PATENT DOCUMENTS

2013/0099421 A1* 4/2013 Kariya ............... B29C 45/0005
264/328.18
2013/0200552 A1 8/2013 Kariya et al.

FOREIGN PATENT DOCUMENTS

| JP | H01-146925 U | 10/1989 |
| JP | H06-218781 A | 8/1994 |
| JP | 2000-289087 A | 10/2000 |
| JP | 2006-527665 A | 12/2006 |
| JP | WO2012/056565 A1 | 3/2014 |
| JP | 2014-166712 A | 9/2014 |

OTHER PUBLICATIONS

China Patent Office, "Office Action for Chinese Patent Application No. 201580073083.X," dated Dec. 3, 2018.
China Patent Office, "Office Action for Chinese Patent Application No. 201580073083.X," dated Apr. 10, 2019.
Liu, T., "Polymer Molding Machine," Jul. 31, 2005, p. 218-219, China Light Industry Press Ltd.

* cited by examiner

SCREW FOR INJECTION MOLDING MACHINE, INJECTION MOLDING MACHINE, AND INJECTION MOLDING METHOD

RELATED APPLICATIONS

The present application is National Phase of International Application No. PCT/JP2015/000156 filed Jan. 15, 2015, the disclosure of which is hereby incorporated by reference herein in its entirety.

TECHNICAL FIELD

The present invention relates to injection molding of a resin containing a reinforcing fiber.

BACKGROUND ART

A molded product of a fiber reinforcing resin in which the strength is enhanced by containing a reinforcing fiber is used for various purposes. The molded product is prepared by causing a mixture of a thermoplastic resin and the reinforcing fiber melted in response to rotations of a screw inside a cylinder configuring a plasticizing apparatus to be injected into a mold of an injection molding machine.

In order to obtain an effect of improving the strength by using reinforcing fibers, it is desired that the reinforcing fibers are uniformly dispersed in a resin. In order to realize the uniform dispersion, a shearing force applied to the reinforcing fibers may be strengthened under strict conditions of mixing. However, an excessively strong shearing force results in cutting of the reinforcing fiber. Consequently, the fiber length after molding becomes significantly shorter than the initial fiber length, and there is a possibility that an obtained molded product cannot satisfy desired characteristics.

As a countermeasure thereof, PTL 1 discloses that a molded product in which comparatively long fibers are homogenously dispersed can be obtained by using a vent-type injection molding machine in which vent-up is unlikely to occur, feeing the reinforcing fibers through a vent port, and mixing the reinforcing fibers with a molten resin from the upstream side. PTL 1 proposes a specific injection molding machine including a raw material feed zone, a first stage, a mixing (kneading) portion, and a second stage. In the injection molding machine, a vent portion is provided immediately after the mixing portion, and the second stage has a shape of a multi-start screw including three or more threads.

CITATION LIST

Patent Literature

[PTL 1] Japanese Unexamined Patent Application Publication No. 2014-166712

SUMMARY OF INVENTION

Technical Problem

According to PTL 1, a multi-start screw portion configuring a second stage is provided across the overall length. Therefore, it is possible to mention that the kneading effect in the second stage is high. However, the contact frequency of apex portions which are tips of flights and an inner wall surface of a cylinder increases in accordance with the number of the flights. In a screw, core run-out, that is, run-out whirling of a rotating axis unavoidably occurs in response to rotations thereof. Therefore, when the contact frequency of the apex portions of the flights and the inner wall surface of the cylinder increases, due to a core run-out force of the screw, that is, a force of pressing the flights to an inner diameter surface of the cylinder caused due to run-out whirling of the screw, a disadvantage such as an occurrence of scuffing can occur in accordance with sliding between the apex portions of the flights and the inner wall surface of the cylinder. In addition, in the multi-start screw portion, the ratio of the area of a flow path wall (the surface of the screw groove and the inner diameter surface of the cylinder) to a cross-sectional area of a flow path is significant, and friction resistance (flow resistance) received from the wall surface is significant. Therefore, in the shape of PTL 1 in which the length of the multi-start screw portion reaches the overall length of the second stage, clogging of a molten resin and a reinforcing fiber occurs inside a multi-start screw, and the plasticizing ability deteriorates. In addition, in such a case, since a mixture requires a long period of time to pass through the screw, the degree of kneading rises, thereby resulting in an increase of fiber breakage and a disadvantage of molding quality such as burning of a staying resin caused due to a temperature rise of the resin.

Therefore, an object of the present invention is to provide a screw which can be used in injection molding of a fiber reinforcing resin, while standing to benefit from the kneading effect of a multi-start screw, in which a disadvantage of scuffing can be prevented and receiving friction resistance can be minimally restrained.

In addition, another object of the present invention is to provide an injection molding method for a fiber reinforcing resin using such a screw, and a further another object thereof is to provide an injection molding machine for a fiber reinforcing resin including such a screw.

Solution to Problem

According to the present invention, there is provided a screw including a first stage that is provided on an upstream side, and a second stage that is provided on a downstream side of the first stage. The first stage includes a compression zone provided with a main flight and an auxiliary flight having an outer diameter smaller than the outer diameter of the main flight. The second stage includes a multi-start screw portion which is provided on an upstream side and has a plurality of flights, and a kneading portion which is provided on a downstream side of the multi-start screw portion and has a fin.

The first stage is a stage of mainly performing plasticizing melting of a resin pellet P, and the second stage is a stage of mainly kneading a mixture of a reinforcing fiber and a molten resin.

In the screw according to the present invention, it is preferable that when a diameter of an apex portion of the main flight is D, the length of the screw, in which the multi-start screw portion is provided, in a rotating axis direction ranges from 2 D to 5 D.

In addition, in the screw according to the present invention, it is preferable that the number of the flights in the multi-start screw portion ranges from 6 to 10 and the number of times of winding of each of the flights in the multi-start screw portion ranges from 1 to 2.

In addition, it is preferable that a groove depth of the multi-start screw portion is a groove depth equal to or deeper than the groove depth of a downstream side terminal end portion of the first stage.

In the screw according to the present invention, it is preferable that the fin kneading portion includes a plurality of fin groups which are disposed with gaps in the rotating axis direction and each of which has a plurality of plate-like fins provided with gaps in a circumferential direction; and when the diameter of the apex portion of the main flight is D, the length of each fin in the rotating axis direction ranges from 0.05 D to 0.2 D, the gap between the fins adjacent to each other in the rotating axis direction ranges from 0.1 D to 0.2 D, and the number of lines of the fin groups ranges from 5 to 10.

The screw according to the present invention is effective in a case where when the diameter of the apex portion of the main flight is D, D is equal to or greater than 90 mm.

In addition, according to the present invention, there is provided an injection molding machine including a cylinder that is provided with an injection nozzle, and a screw that is provided inside the cylinder so as to be able to rotate around a rotating axis and to be able to advance and retreat along the rotating axis. The injection molding machine performs injection molding of a fiber reinforcing resin and uses any of the screws described above.

In the injection molding machine, it is preferable that a feed port through which a reinforcing fiber is able to be fed into the cylinder together with a resin raw material is provided on an upstream side of the cylinder.

In addition, according to the present invention, there is provided an injection molding method including a plasticizing step of generating a molten resin by individually feeding a solid resin raw material and a reinforcing fiber to a cylinder having a screw which is able to rotate around a rotating axis and is able to advance and retreat along the rotating axis and normally rotating the screw, and an injecting step of injecting a mixture of the reinforcing fiber and the molten resin toward a cavity of a mold. The injection molding method uses any of the screws described above.

In the injection molding method, it is preferable that the reinforcing fiber is fed on an upstream side of the cylinder together with the resin raw material.

Advantageous Effects of Invention

According to the present invention, while standing to benefit from the kneading effect of a multi-start screw, a disadvantage of scuffing can be prevented and receiving friction resistance can be minimally restrained.

BRIEF DESCRIPTION OF DRAWINGS

FIG. 2 is a view schematically illustrating molten states of a resin in each procedure of injection molding according to the present embodiment.

DESCRIPTION OF EMBODIMENT

Hereinafter, the present invention will be described in detail based on an embodiment illustrated in the accompanying drawings.

Figure 1:
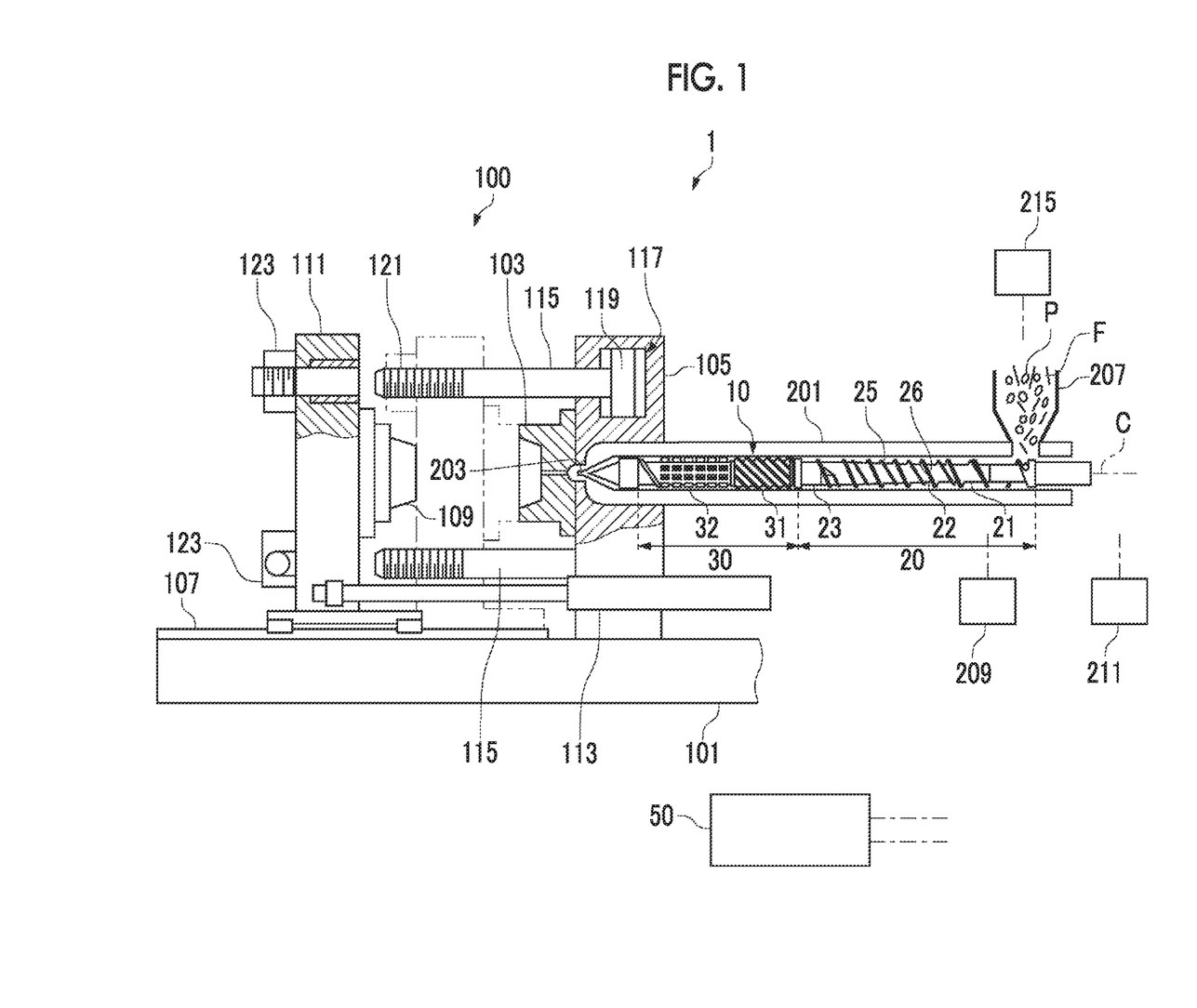
FIG. 1 is a view illustrating a schematic configuration of an injection molding machine according to the present embodiment.

As illustrated in FIG. 1, an injection molding machine 1 according to the present embodiment includes a mold clamping unit 100, a plasticizing unit 200, and a control section 50 which controls operations of the units.

Hereinafter, the outline of the configuration and the operation of the mold clamping unit 100, and the configuration and the operation of the plasticizing unit 200 will be described. Subsequently, the procedure of injection molding performed by the injection molding machine 1 will be described.

[Configuration of Mold Clamping Unit]

The mold clamping unit 100 includes a stationary platen 105 which is fixed to the top of a base frame 101 and to which a fixed mold 103 is attached, a movable platen 111 which moves in the lateral direction of the view on a slide member 107 such as a rail and a slide plate due to an operation of a hydraulic cylinder 113 and to which a movable mold 109 is attached, and a plurality of tie bars 115 which interlock the stationary platen 105 and the movable platen 111 with each other. The stationary platen 105 is provided with a mold-clamping hydraulic cylinder 117 coaxially with each of the tie bars 115. One end of each tie bar 115 is connected to a ram 119 of the hydraulic cylinder 117.

Each of the elements performs a necessary operation in response to an instruction of the control section 50.

[Operation of Mold Clamping Unit]

The outline of the operation of the mold clamping unit 100 is as follows.

First, in accordance with an operation of the mold open/close hydraulic cylinder 113, the movable platen 111 moves to a position indicated with the two-dot chain line in the view, and the movable mold 109 is caused to abut on the fixed mold 103. Subsequently, a male screw portion 121 of each tie bar 115 and a halved nut 123 provided in the movable platen 111 are engaged with each other, and the movable platen 111 is fixed to the tie bars 115. The pressure of hydraulic oil of an oil chamber inside the hydraulic cylinder 117 on the movable platen 111 side is raised, and the fixed mold 103 and the movable mold 109 are tightened together. In this manner, after mold clamping is performed, a molten resin M is injected from the plasticizing unit 200 into a cavity of a mold, thereby molding a molded product.

A screw 10 of the present embodiment adopts a type in which a thermal plastic resin pellet P and a reinforcing fiber F are individually prepared and are mixed together by being inserted into a feed hopper 207 provided in the vicinity of the upstream end of the screw 10. However, the configuration of the mold clamping unit 100 specifically described below is merely an example and does not prohibit a different configuration from being applied or replacing the configuration. For example, in the present embodiment, the hydraulic cylinder 113 is illustrated as a mold open/close actuator. However, the hydraulic cylinder 113 may be replaced with a combination of a mechanism converting a rotational movement into a rectilinear movement and an electric motor such as a servo motor and an induction motor. As the conversion mechanism, a ball screw or a rack-and-pinion can be adopted. In addition, it is needless to mention that the mold clamping unit may be replaced with a toggle link-type mold clamping unit which operates through electric driving or hydraulic driving.

In the present embodiment and the present invention, the upstream and the downstream are determined based on an orientation in which the resin pellet P (the molten resin M) and the reinforcing fiber F are transported. The resin pellet P and the reinforcing fiber F are fed via the feed hopper 207 provided at the upstream end and are injected to the cavity of the mold through an injection nozzle 203 provided at the downstream end. Most of the reinforcing fibers F input to the feed hopper 207 are in a bundled state, and it is important to open this fiber bundle in order to ensure dispersion of the reinforcing fibers F.

[Configuration of Plasticizing Unit]

The plasticizing unit 200 includes a barrel-type heating barrel 201, the injection nozzle 203 which is provided at the downstream end (the front side) of the heating barrel 201, the screw 10 which is provided inside the heating barrel 201, and the feed hopper 207 in which the resin pellet P and the reinforcing fiber F are fed. In addition, the plasticizing unit 200 includes a first electric motor 209 which causes the screw 10 to advance or retreat, and a second electric motor 211 which causes the screw 10 to normally rotate or reversely rotate. Each of the elements performs a necessary operation in response to an instruction of the control section 50.

A load cell (not illustrated) is interposed between the end portion (the back end) of the screw 10 on the downstream side and the first electric motor 209 such that a load received by the screw 10 in the axial direction can be detected. The plasticizing unit 200 operated by the electric motor controls the back pressure of the screw 10 in plasticizing based on the load detected by the load cell.

The screw 10 employs two-stage-type design. However, as described below, the screw 10 is different from a general gas vent-type screw known as a two-stage-type screw in configuration, purpose, action, and effect.

The screw 10 includes a first stage 20 which is provided on the upstream side and a second stage 30 which leads to the first stage 20 and is provided on the downstream side.

The first stage 20 includes a feed zone 21, a compression zone 22, and a metering zone 23 in order from the upstream side. In the periphery of the compression zone 22, there are provided a main flight 25 and an auxiliary flight 26 having an outer diameter smaller than that of the main flight 25. In addition, the auxiliary flight 26 has a lead angle set to be greater than that of the main flight 25. It is preferable that the both ends of the auxiliary flight 26 are blocked by the main flight 25. When the both ends or one end of the auxiliary flight 26 is separated from the main flight 25, the molten resin M and the reinforcing fiber bundle leak out through the gap without having the bonding disentangled. In contrast, when being blocked, the molten resin M goes through the apex portion of the auxiliary flight 26 without leaking. Therefore, bonding of the reinforcing fiber bundle can be disentangled by applying a shearing force and the disentangled reinforcing fiber bundle can be transported the downstream side.

The first stage 20 is considered to separate a solid resin and a molten resin by providing the auxiliary flight 26 and to perform compression gently, that is, gently with a comparatively weak force. Accordingly, it is possible to restrain the solid resin from causing clogging inside a screw groove of the first stage 20, becoming a wedge with respect to the heating barrel 201, and causing biased weighting, eccentricity, and run-out whirling in the screw 10.

The second stage 30 includes a multi-start screw portion 31 and a fin kneading portion 32 in order from the upstream.

In the present embodiment, the multi-start screw portion 31 merely configures a part of the second stage 30. The reason is that the risk of scuffing of the apex portion of the flight caused due to run-out whirling of the second stage 30 when the screw 10 rotates is reduced by shortening the length of the region of the multi-start screw portion 31.

When the fin kneading portion 32 is provided on the downstream side of the multi-start screw portion 31, and an agitation effect by the fin and an effect of relaxing the flow resistance are alternately applied, a kneading effect can be applied to the reinforcing fiber F without causing clogging.

The first stage 20 and the second stage 30 provided based on the gist above will be described with reference to FIG. 3.

In the first stage 20, the resin pellet P is melted and the molten resin M is generated. In addition, the generated molten resin M is transported toward the second stage 30. Therefore, the first stage 20 is desired to have a function of ensuring the transportation speed and the plasticizing ability for the molten resin M.

Figure 3:
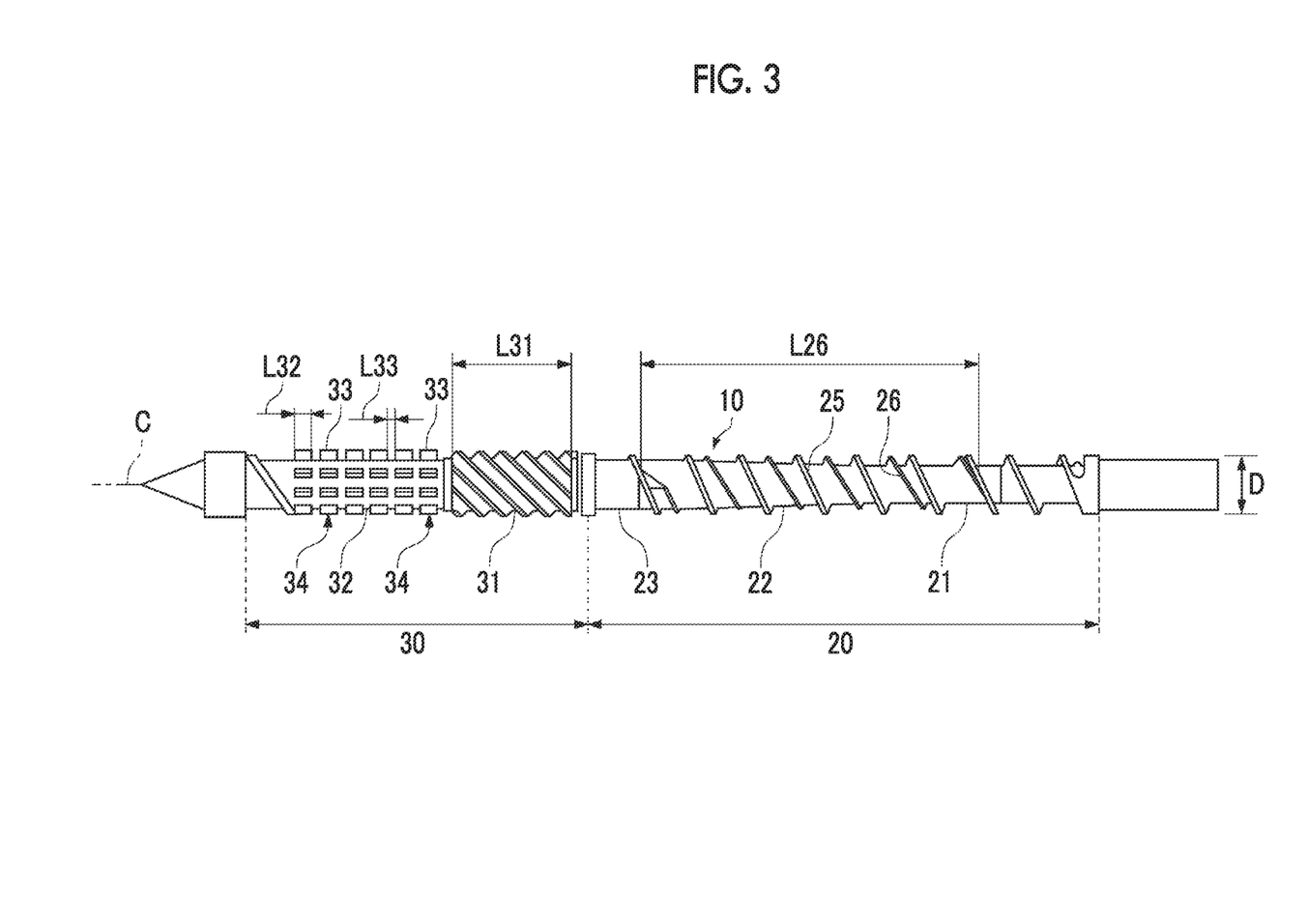
FIG. 3 is a view illustrating a screw according to the present embodiment.

In addition, as illustrated in FIG. 3, in the auxiliary flight 26 provided in the first stage 20, when the outer diameter (the diameter) of the apex portion of the main flight 25 is D, it is preferable that a length L26 in a rotating axis C direction is provided so as to be settled within a range from 7 D to 12 D. Consequently, in the first stage 20, it is possible to include all or most of the compression zone 22 which is gentle and has a long length in which the necessary and sufficient groove depth is decreased with respect to the melting amount of the resin. When the length L26 is less than 7 D, the solid resin reaches the downstream end of the auxiliary flight while having the insufficient melting degree. Accordingly, there is a possibility that the solid resin cannot go through the auxiliary flight 26 and the solid resin is clogged inside the groove of the screw 10. In addition, particularly, when the resin pellet P is clogged inside the groove of the screw 10, the screw groove is sealed by the resin pellet P and the flow of the molten resin is congested. Moreover, the plasticizing ability deteriorates and the pressure on the upstream side including the clogged spot inside the compression zone 22 becomes excessive. Then, excessive compression force and shearing force are added to the reinforcing fiber F present in the clogged resin pellet P, thereby increasing the breakage of the reinforcing fiber F. In addition, since the solid resin tends to forcibly go through the downstream end of the auxiliary flight 26, the solid resin enters a space between the auxiliary flight 26 and the inner diameter surface of the heating barrel 201 like a wedge. Biased weighting is added to the screw 10 due to a wedge action, thereby causing a disadvantage such as an occurrence of scraping abrasion. Meanwhile, when the length L26 exceeds 12 D, the molten resin and the solid resin cannot be orderly separated from each other, and there is a possibility that the solid resin floats in the molten resin M. In this case, the shearing force caused due to rotations of the screw is absorbed in accordance with deformation of the molten resin M and is not transferred to the resin pellet P. Therefore, the plasticizing ability deteriorates. Particularly, when the length of the auxiliary flight 26 significantly exceeds the length of the compression zone which is a melting region of the resin, the molten resin M and the solid resin are insufficiently separated from each other, and the solid resin floats in the molten resin M. Therefore, the deterioration of the plasticizing ability increases. Thus, the length L26 of the auxiliary flight 26 provided in the first stage 20 is provided so as to be settled within the range from 7 D to 12 D, and the fiber bundle is gradually loosened so as to be opened. In addition, a mixture of the molten resin M in which the reinforcing fibers F are dispersed to a certain degree, and the reinforcing fiber F is generated and is given to the second stage 30, thereby contributing to restrain the occurrence of slide scuffing in the apex portion of the flight of the multi-start screw portion 31 of the second stage 30 and the deterioration of the plasticizing ability.

It is more preferable that the length L26 ranges from 8 D to 11 D, and it is further more preferable that the length L26 ranges from 9 D to 10 D.

Subsequently, as illustrated in FIG. 3, it is preferable that a length L31 of the multi-start screw portion 31 of the second stage 30 in the rotating axis C direction is provided so as to range from 2 D to 5 D.

When the length L31 is shorter than 2 D, the number of times and the degree of turning of the reinforcing fiber F and the molten resin M become insufficient inside the groove of the multi-start screw portion 31, and the kneading effect cannot be sufficiently obtained. Meanwhile, when the length L31 is longer than 5 D, the kneading effect can be sufficiently obtained. However, particularly in a case where the number of the flights exceeds five, many apex portions of the flights comes into contact with and slides with respect to the inner diameter surface of the heating barrel 201 for a long period of time, and the contact frequency increases due to core run-out of the screw 10 when plasticizing is performed. As a result of intent studies, it is found that slide scuffing of the apex portion of the flight is likely to occur. It is more preferable that the length L31 ranges from 2.5 D to 4.5 D, and it is further more preferable that the length L31 ranges from 2 D to 4 D.

In addition, it is preferable that the number of the flights in the multi-start screw portion 31 ranges from 6 to 10.

Instead of shortening the length L31 of the multi-start screw portion 31, when the number of flights is caused to range from 6 to 10, a mixture of the molten resin M flowing in from the first stage 20 and the reinforcing fiber F is branched in accordance with the number of flights. Accordingly, the number of times of turning of each reinforcing fiber F per unit weight inside the screw groove increases. Therefore, the agitation effect can be increased and the dispersion degree of the reinforcing fiber F can be improved.

On the premise that the length L31 of the multi-start screw portion 31 is set to be short ranging from 2 D to 5 D, when the number of the flights is less than 6, it is difficult to obtain a high dispersion state of the reinforcing fibers F, and there is a possibility that the fiber bundle which has not been opened is mixed in the molded product as it stands. In addition, when the number of the flights exceeds 10, the cross-sectional area of the screw groove per one becomes small, and there is a possibility that the reinforcing fiber F is clogged inside the groove. Consequently, the plasticizing ability deteriorates, thereby resulting in an increase of breakage of the reinforcing fiber F caused due to the high degree of kneading and resulting in a disadvantage regarding the quality of the molded product, such as burning of a staying resin caused due to a temperature rise of the resin. It is more preferable that the number of flights ranges from 7 to 9.

It is preferable that the number of times of winding of each flight in the multi-start screw portion 31 ranges from 1 to 2. As the result thereof, the lead of the flight is increased, that is, the moving distance of the reinforcing fiber F per one rotation of the screw 10 is increased. Accordingly, the time for the reinforcing fiber F to pass through the multi-start screw portion 31 is shortened, and clogging of the reinforcing fiber F inside the screw groove of the multi-start screw portion 31 is restrained. In contrast, when the number of times of wining is less than one, the time for the reinforcing fiber F to pass through the multi-start screw portion 31 is excessively short. Accordingly, the number of times of turning of the reinforcing fiber F in the multi-start screw portion 31 is reduced, and a sufficient dispersion effect of the reinforcing fibers F cannot be obtained.

Each flight configuring the multi-start screw portion 31 has the same outer diameter and the same lead angle.

In addition, in the multi-start screw portion 31, the cross-sectional area in which the molten resin M can flow is decreased due to the region occupied by the cross section of the flight. Therefore, particularly in a case of the molten resin M having a high content rate of the reinforcing fiber F, clogging is likely to occur inside the groove. In order to prevent the clogging, it is preferable that the groove depth of the multi-start screw portion 31 is deeper than the groove depth of the metering zone 23 which is a downstream side terminal end portion of the first stage. In addition, in order to sufficiently release the compression added to the reinforcing fiber F and the molten resin M, to lower the pressure, and to promote the opening of the fibers by increasing and expanding a space such that the reinforcing fiber F can freely turn and be positionally replaced, it is more preferable that the groove depth of the multi-start screw portion 31 becomes a groove depth such that the total sum of the cross-sectional areas of the grooves of the multi-start screw portion 31 is equal to or greater than the cross-sectional area of the groove of the metering zone 23 of the first stage 20.

Subsequently, as illustrated in FIG. 3, the fin kneading portion 32 provided on the downstream side of the multi-start screw portion 31 is formed to be a multi-start fin type and includes a plurality of fin groups 34 which are disposed with gaps in the rotating axis C direction and each of which has a plurality of plate-like fins 33 provided with gaps in a circumferential direction.

In the fin kneading portion 32, it is preferable that the length L32 of each fin 33 in the rotating axis C direction ranges from 0.05 D to 0.2 D, and a gap L33 between the fin 33 and the fin 33 adjacent each other in the rotating axis C direction ranges from 0.1 D to 0.2 D. In addition, it is preferable that the number of lines of the fin groups 34 ranges from 5 to 10 lines.

In this manner, on the downstream side of the multi-start screw portion 31, the fins 33 having comparatively short lengths and regions which are provided with no fin 33, in which the cross-sectional area of the flow path is significant, and of which the flow resistance is small (the gaps between the fins 33 in the rotating axis C direction and the gaps in the circumferential direction) are alternately provided. When the fin kneading portion 32 is provided in this manner, the agitation effect by the fins 33 and an effect of relaxing the flow resistance are alternately applied to a mixture of the molten resin M and the reinforcing fiber F, and a kneading effect can be applied to the reinforcing fiber F without causing clogging.

Subsequently, as illustrated in FIG. 1, in the injection molding machine 1 of the present embodiment, the reinforcing fiber F is input together with the resin pellet P from the feed hopper 207 corresponding to the upstream end of the screw 10. In this manner, in the present embodiment, since the reinforcing fiber F is not fed to the second stage 30, there is no need to provide a vent hole corresponding to the second stage 30 in the heating barrel 201, and there is no risk of vent-up of overflowing of the molten resin through the vent hole. Accordingly, the molten resin M can fill the inside of the screw groove across the overall length and the entire circumference of the second stage 30, and it is possible to avoid the occurrence of an aperture which is not filled with the molten resin M inside the screw groove depending on the position. Therefore, there is no uneven distribution of the aperture portions having no pressure of the molten resin and the molten resin M having the pressure of the molten resin, or fluctuated distribution. As the result thereof, the pressure of the molten resin uniformly acts on the screw 10 across the overall length and the entire circumference of the second stage 30. Therefore, an occurrence of local and biased weighting of pressing the screw 10 in one of not-intended directions in the radial direction is restrained, and an occurrence of a disadvantage in the apex portion of the flight of the multi-start screw portion 31 caused by slide scuffing can be restrained.

[Operation of Plasticizing Unit]

The outline of the operation of the plasticizing unit 200 is as follows. Refer to FIG. 1.

When the screw 10 provided inside the heating barrel 201 rotates, a pellet (the resin pellet P) formed of a thermoplastic resin fed from the feed hopper 207, and the reinforcing fiber F are sent out toward the injection nozzle 203 at the downstream end of the heating barrel 201. In this process, the resin pellet P becomes the molten resin M. After being mixed with the reinforcing fiber F, the molten resin M is injected as much as a prescribed amount into the cavity formed between the fixed mold 103 and the movable mold 109 of the mold clamping unit 100. It is needless to mention that the injection is accompanied by the basic operation of the screw 10 in which the screw 10 advances after the screw 10 retreats while receiving the back pressure in accordance with melting of the resin pellets P. In addition, a different configuration, for example, a heater for melting the resin pellets P is provided outside the heating barrel 201 is not prohibited from being applied or replacing the configuration.

[Procedure of Injection Molding]

The injection molding machine 1 having the above-described elements performs injection molding through the following procedure.

As is widely known, the injection molding includes a mold clamping step of closing the movable mold 109 and the fixed mold 103 and performing mold clamping at high pressure, the plasticizing step of heating, melting, and plasticizing the resin pellets P inside the heating barrel 201, the injecting step of injecting and the plasticized molten resin M into the cavity formed by the movable mold 109 and the fixed mold 103 and filling the cavity, a holding step of cooling the molten resin M filling the cavity until the molten resin M is solidified, a mold opening step of opening the mold, and a taking out step of taking out the molded product which is cooled and solidified inside the cavity. One cycle of injection molding is completed by sequentially performing each of the above-described steps or concurrently executing the portions thereof.

Figure 2A:
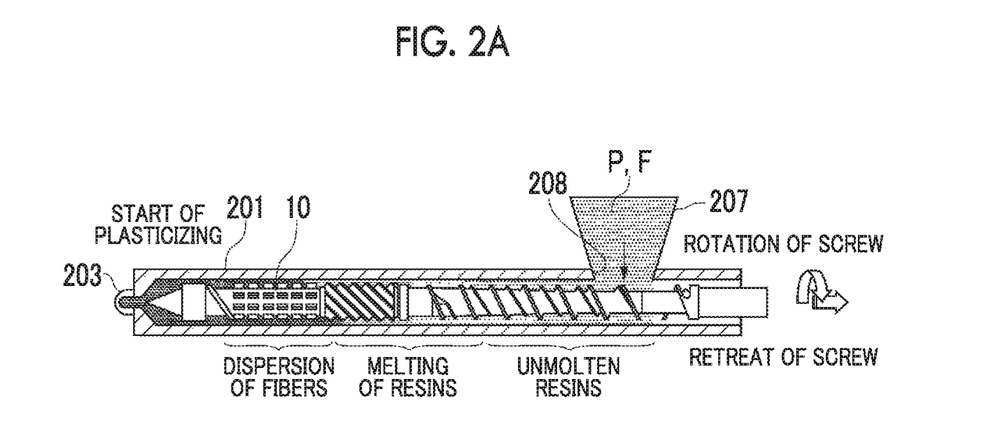
FIG. 2(a) illustrates a state when plasticizing starts.
Figure 2B:
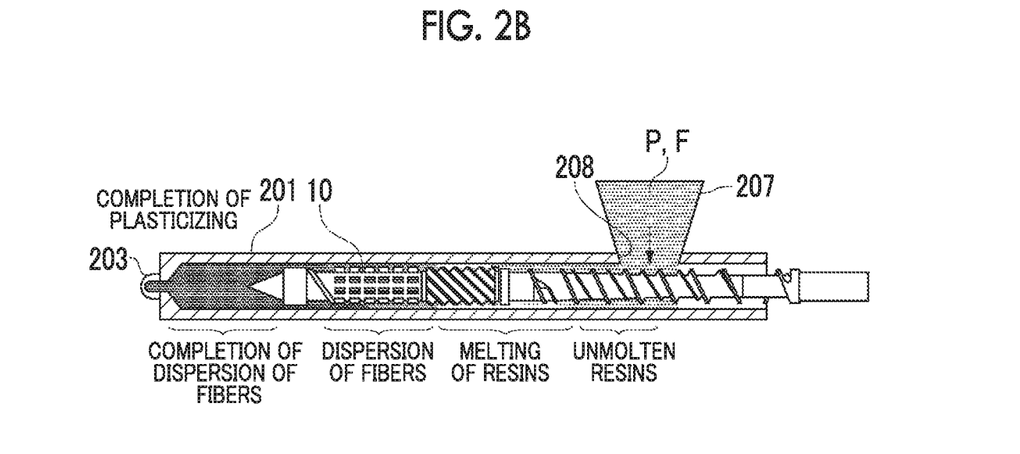
FIG. 2(b) illustrates a state when plasticizing is completed.

Subsequently, in the process described above, outlines of the plasticizing step and the injecting step related to the present embodiment will be described with reference to FIG. 2.

[Plasticizing Step]

In the plasticizing step, the resin pellets P and the reinforcing fibers F are fed through a feed port corresponding to the feed hopper 207 of the heating barrel 201 on the upstream side. The screw 10 at the time of the start of plasticizing is positioned on the downstream side of the heating barrel 201, and the screw 10 retreats from the initial position while rotating (FIG. 2(a), "start of plasticizing"). When the screw 10 rotates, the resin pellets P fed to a space between the screw 10 and the heating barrel 201 are heated by receiving a shearing force and are gradually melted, thereby being transported toward the downstream side. In the present invention, the rotation (the orientation) of the screw 10 in the plasticizing step is referred to as the normal rotation. In accordance with the rotation of the screw 10, the reinforcing fibers F are kneaded with the molten resin M and are dispersed, thereby being transported to the downstream together with the molten resin M. When the resin pellets P and the reinforcing fibers F continue to be fed and the screw 10 continuously rotates, the molten resin M is transported to the downstream side of the heating barrel 201 together with the reinforcing fibers F, and the molten resin M is accumulated on the downstream side beyond the screw 10. The screw 10 retreats due to the balance between the resin pressure of the molten resin M accumulated on the downstream side of the screw 10 and the back pressure restraining the screw 10 from retreating. Thereafter, when the amount of the molten resin M necessary for one shot is measured and accumulated, the rotation and the retreat of the screw 10 are halted (FIG. 2(b), "completion of plasticizing").

FIG. 2 illustrates states of resins (the resin pellets P, the molten resin M) and the reinforcing fibers F divided into four stages such as "unmolten resins", "melting of resins", "dispersion of fibers", and "completion of fiber dispersion". In the stage of "completion of plasticizing", "completion of fiber dispersion" on the downstream side beyond the screw 10 indicates a state where the reinforcing fibers F are dispersed in the molten resin M and are injected, and "dispersion of fibers" indicates that the fed reinforcing fibers F are dispersed in the molten resin M in accordance with the rotation of the screw 10. In addition, "melting of resins" indicates that the resin pellets P are gradually molten by receiving the shearing force, and "unmolten resins" indicates a state where even though the shearing force is received, an insufficiently molten resin remains and the entirety of the resin is not molten. However, in the region of "completion of fiber dispersion", there are cases where the reinforcing fibers F are unevenly distributed.

[Injecting Step]

Figure 2C:
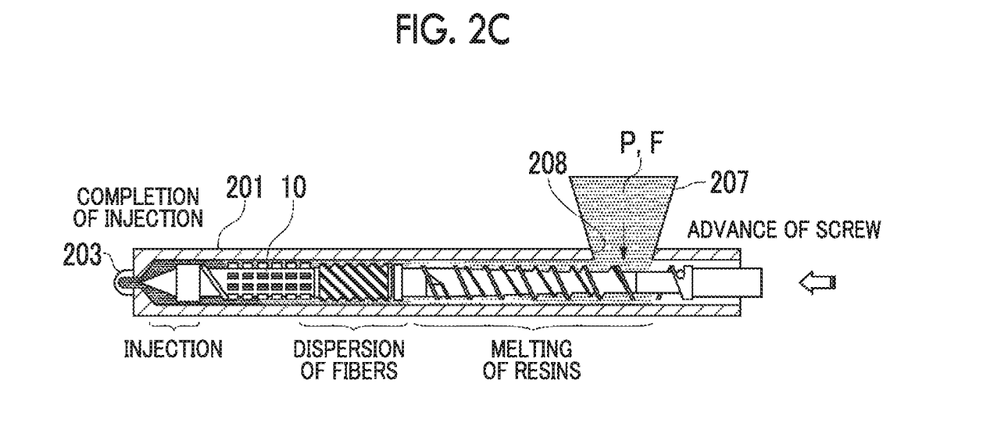
FIG. 2(c) illustrates a state when injection is completed.

In the injecting step, as illustrated in FIG. 2(c), the screw 10 advances. Consequently, a backflow prevention valve (not illustrated) provided at the tip portion of the screw 10 is closed. Thus, the pressure (the resin pressure) of the molten resin M accumulated on the downstream side of the screw 10 rises, and the molten resin M is discharged from the injection nozzle 203 into the cavity.

Then, after passing through the holding step, the mold opening step, and the taking out step, one cycle of injection molding is completed, and the mold clamping step and the plasticizing step for the next cycle are performed.

[Effect]

As described above, in the present embodiment, the length of the multi-start screw portion 31 of the second stage 30 in the rotating axis direction is set to be short, and a compression force in the first stage 20 is caused to be gentle. Therefore, while standing to benefit from the kneading effect of the multi-start screw portion 31, the friction resistance received by the reinforcing fiber F from the screw 10 and fiber breakage by the shearing force can be minimally restrained. Moreover, the fin kneading portion 32 is provided in the second stage 30 so as to secure the kneading as much as the multi-start screw portion 31 is shortened.

Subsequently, compared to a single-start screw, in the multi-start screw, the ratio of the area of the flow path wall (the surface of the screw groove and the inner diameter surface of the cylinder) to the cross-sectional area of the flow path is significant, and the flow resistance received from the wall surface is significant. Therefore, when the length of the multi-start screw becomes long, clogging of the molten resin M and the reinforcing fiber F occurs inside the multi-start screw, and the plasticizing ability deteriorates, thereby leading to breakage of the reinforcing fiber F due to a rise of the degree of kneading. In addition, it is concerned that quality deterioration occurs, such as an occurrence of burning of a staying resin caused due to a temperature rise of the resin. In contrast, in the present embodiment, the multi-start screw portion 31 is provided so as to be short in a part of the second stage 30. Therefore, the quality deterioration of the molded product can be restrained.

In addition, the screw 10 according to the present embodiment includes each of the kneading elements such as the main flight 25, the compression zone 22 which is provided with the auxiliary flight 26 having an outer diameter smaller than that of the main flight 25, the multi-start screw portion 31 including the plurality of flights, and the fin kneading portion 32 in the above-described order from the upstream side. The reason is that the layout in which shearing and kneading action are increased in stage from the upstream side of the screw is effective to cause opening, the dispersion effect, and an effect of preventing clogging inside the screw groove to be compatible. Specifically, compared to a reinforcing fiber bundle in which bonding is strong immediately after being input through the feed port of the feed hopper 207 in a state where absorption of the shearing force caused due to deformation is small, and there is a possibility that breakage of the fibers occurs when a strong shearing force is suddenly applied, according to the present embodiment, bonding of the reinforcing fiber bundle is disentangled by the auxiliary flight 26 portion that is a kneading element in which shearing and kneading is the gentlest among each of the kneading elements, and the disentangled fibers are mixed into the molten resin M and are sent to the downstream side. A mixture in a state of having many remaining fiber bundles to the extent that the bonding is disentangled is caused to flow into the multi-start screw portion 31 including the plurality of flights, thereby branching the fiber bundles, efficiently kneading the fiber bundles, and promoting dispersion of the fibers. Subsequently, agitation is intermittently performed in the fin kneading portion 32 in which the agitation effect and the effect of relaxing the flow resistance can be alternately applied. Accordingly, most of the fiber bundles are opened in the multi-start screw portion 31 on the upstream side, and even in a state where the fibers are entangled and flocculated such that clogging is likely to occur, shearing and kneading can be promoted without causing clogging. This layout is effective to obtain the effect of the present invention particularly with respect to a raw material which has a high content rate such as 10% or more of the content of the reinforcing fiber and in which clogging is likely to occur inside the screw groove.

As described above, the multi-start screw portion 31 has many and long apex portions of the flights which come into contact with and slide with respect to the inner diameter surface of the cylinder, and the contact frequency increases. Therefore, slide scuffing of the apex portions of the flights is likely to occur. Therefore, it is preferable to perform the processing with high accuracy in order to prevent poor straightness causing scuffing in shape. However, when the processing is performed with high accuracy such that the fluctuation of the straightness does not become significant, an occurrence of the slide scuffing can be reduced. However, it takes a long period of processing time and requires expensive processing cost, thereby degrading the productivity. In contrast, according to the present embodiment, even in a case of using a multi-start screw in which a high kneading effect can be obtained, while the processing cost is restrained, an occurrence of slide scuffing can be reduced. Incidentally, in an injection molding machine of which a mold clamping force is equal to or greater than 850 ton or of which the screw diameter D is equal to or greater than 90 mm, in a long multi-start screw, for example, of which the length is approximately five times or longer than the screw diameter D, scuffing is likely to occur in the apex portion of the flight due to run-out whirling of the screw. The reason is that in a case where there is local and rapid fluctuation occurs in the pressure of the molten resin inside the screw groove, since the screw having a small diameter (for example, Φ50 mm or smaller) has a small surface area of the screw, the area for taking the pressure of the fluctuating pressure fluctuation value becomes small, and even though the fluctuation pressure value is slightly significant, the absolute value of biased weighting pressing the flights to the inner diameter surface of the cylinder is also small. In contrast, in the screw having a caliber equal to or greater than 90 mm, since the pressure taking area is large, the absolute value of biased weighting pressing the flights to the inner diameter surface of the cylinder is also significant. Therefore, in slide portions of the apex portion of the flight of the screw and the inner diameter surface of the cylinder, extremely significant local stress is generated, and adhesive abrasion, that is, scuffing occurs. However, when the present embodiment is applied, even in a case where the multi-start screw portion 31 which comes into contact with and slides with respect to the inner diameter surface of the cylinder resulting in an increase of the contact frequency is applied to the screw having a screw diameter D equal to or greater than 90 mm, an occurrence of scuffing of the apex portion of the flight can be restrained.

Hereinbefore, the present invention has been described based on the embodiment. However, without departing from the gist of the present invention, the configuration exemplified in the embodiment can be adopted or rejected and can be suitably changed to a different configuration.

For example, in the embodiment described above, as an example of the second stage 30, an example in which the multi-start screw portion 31 is disposed on the upstream side and the fin kneading portion 32 is disposed on the downstream side is illustrated. However, with respect to a raw material having a comparatively low content rate of the reinforcing fiber F, a similar effect can be obtained even if the disposition is reversed.

In addition, the resin and the reinforcing fibers applied to the present invention are not particularly limited. Known materials including a general resin such as polypropylene and polyethylene; a known resin such as engineering plastic including polyamide and polycarbonate; and a known reinforcing fiber such as a glass fiber, a carbon fiber, a bamboo fiber, and a hemp fiber are widely included. In order to remarkably achieve the effect of the present invention, it is preferable to target a fiber reinforcing resin which has a high content rate such that the content of the reinforcing fibers is equal to or greater than 10%. However, when the content rate of the reinforcing fibers exceeds 70%, transport resistance of the reinforcing fibers inside the screw groove increases. Therefore, in a case of using a flight which has a small diameter and comparatively low ability of transporting the resin, it is difficult to transport the reinforcing fibers, and thus, there is a possibility that the reinforcing fibers block the inside of the screw groove and cause clogging in a fin portion, the multi-start screw portion 31, or in a region where the auxiliary flight 26 is present, thereby causing deterioration of the plasticizing ability or a disabled state of plasticizing (a disabled state of transporting a resin). Therefore, the reinforcing fibers applied to the present invention are preferable to have the content rate ranging from 10 to 70% and more preferable to range from 15 to 50%.

In addition, since the screw of the present invention has an extremely high kneading effect, even if the screw is applied to molding in which a raw material, an additive, a filling material, and the like are mixed and input into a raw material hopper, it is possible to obtain uniform effects of kneading and dispersion. It is possible to consider a filler, talc, a pigment, and a cellular porous medium as the examples of the additive and the filling material.

In addition, in regard to the reinforcing fiber and the resin raw material to be fed, it is preferable to mix and feed a reinforcing fiber and a raw material resin which are individually prepared in order to remarkably obtain the effect of the present invention. However, it is acceptable even if a composite raw material in which a reinforcing fiber is integrally impregnated with a resin is used.

REFERENCE SIGNS LIST

1 Injection Molding Machine
10 Screw
20 First Stage
21 Feed Zone
22 Compression Zone
23 Metering Zone
25 Main Flight
26 Auxiliary Flight
30 Second Stage
31 Multi-Start Screw Portion
32 Fin Kneading Portion
33 Fin
34 Fin Group
50 Control Section
100 Mold Clamping Unit
101 Base Frame
103 Fixed Mold
105 Stationary Platen
107 Slide Member
109 Movable Mold
111 Movable Platen
113 Hydraulic Cylinder
115 Tie Bar
117 Hydraulic Cylinder
119 Ram
121 Male Screw Portion
123 Nut
200 Plasticizing Unit
201 Heating Barrel
203 Injection Nozzle
207 Feed Hopper
209 First Electric Motor
211 Second Electric Motor
C Rotating Axis
D Screw Diameter
F Reinforcing Fiber
P Resin Pellet

The invention claimed is:

1. An injection molding machine comprising:
a cylinder that is provided with an injection nozzle; and
a screw that is provided inside the cylinder so as to be able to rotate around a rotating axis and to be able to advance and retreat along the rotating axis,
wherein the injection molding machine performs injection molding of a fiber reinforcing resin, and
wherein the screw includes:
a first stage that is provided on an upstream side; and
a second stage that is provided on a downstream side of the first stage,
wherein the first stage includes a feed zone, a compression zone, and a metering zone in order from the upstream side, the compression zone being provided with a main flight and an auxiliary flight having an outer diameter smaller than the outer diameter of the main flight,
wherein the second stage includes a multi-start screw portion which is provided on an upstream side and has a plurality of flights, and a kneading portion which is provided on a downstream side of the multi-start screw portion and has a fin, and
when a diameter of an apex portion of the main flight is D, a length of the screw, in which the multi-start screw portion is provided, in a rotating axis direction ranges from 2 D to 5 D.

2. The injection molding machine according to claim 1, wherein a feed port through which a reinforcing fiber is able to be fed into the cylinder together with a resin raw material is provided on an upstream side of the cylinder.

3. The injection molding machine according to claim 1, wherein the number of the flights in the multi-start screw portion ranges from 6 to 10, and
wherein the number of times of winding of each of the flights in the multi-start screw portion ranges from 1 to 2.

4. The injection molding machine according to claim 1, wherein a groove depth of the multi-start screw portion is a groove depth equal to or deeper than the groove depth of a downstream side terminal end portion of the first stage.

5. The injection molding machine according to claim 1, wherein the kneading portion includes
a plurality of fin groups which are disposed with gaps in the rotating axis direction and each of which has a plurality of plate-like fins provided with gaps in a circumferential direction, and
wherein when the diameter of the apex portion of the main flight is D, the length of each fin in the rotating axis direction ranges from 0.05 D to 0.2 D, the gap between the fins adjacent to each other in the rotating axis direction ranges from 0.1 D to 0.2 D, and the number of lines of the fin groups ranges from 5 to 10.

6. The injection molding machine according to claim 1, wherein when the diameter of the apex portion of the main flight is D, D is equal to or greater than 90 mm.

7. The injection molding machine according to claim 1, wherein a groove depth of the multi-start screw portion is a groove depth such that a total sum of cross-sectional areas of the grooves of the multi-start screw portion is equal to or greater than a cross-sectional area of the groove of the metering which is a downstream side terminal end portion of the first stage.

* * * * *